Figures 1, 2:
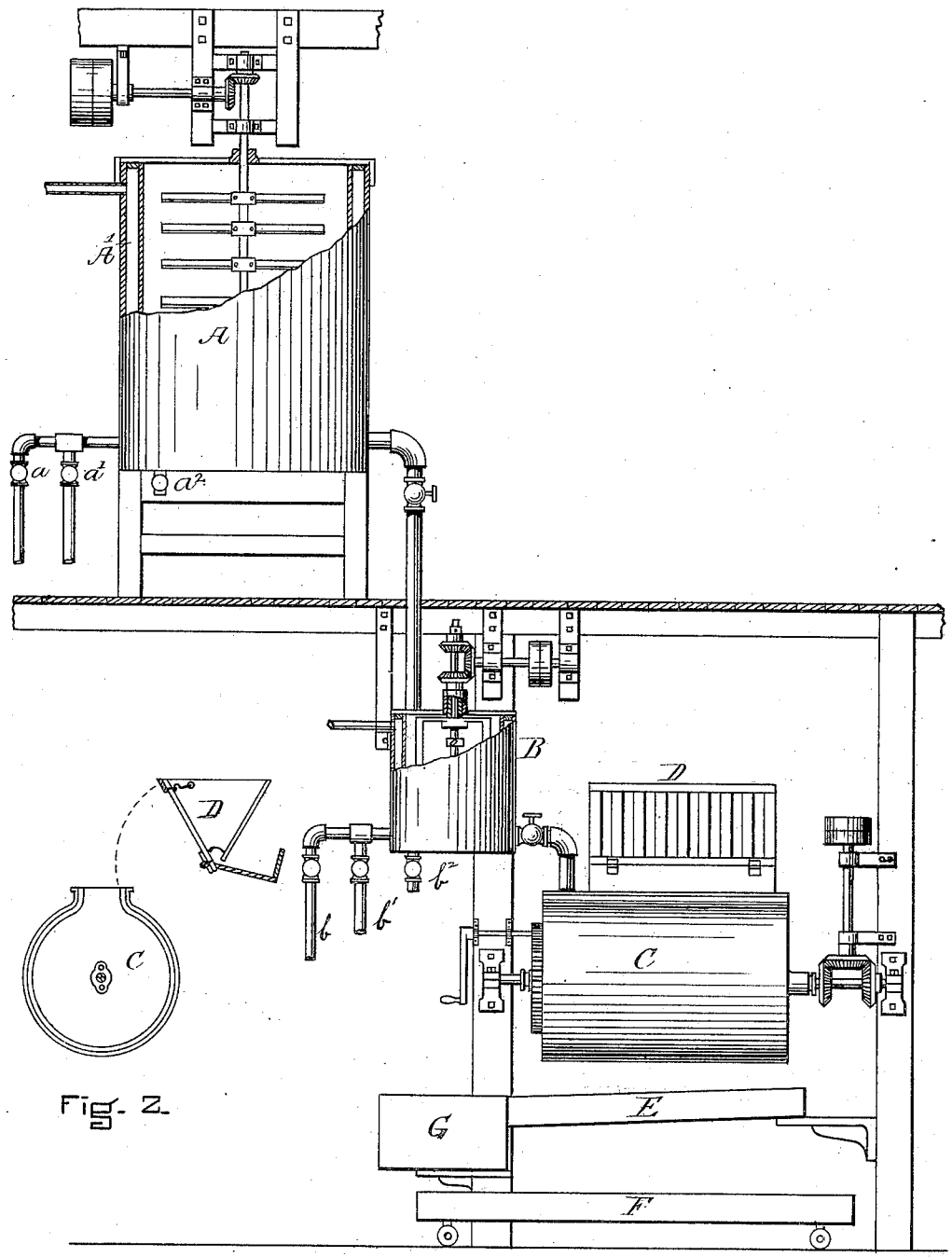

(No Model.)

S. H. COCHRAN.
ART OF MAKING ARTIFICIAL BUTTER.

No. 285,878. Patented Oct. 2, 1883.

WITNESSES
J. F. Bligh
M. J. Lowe

INVENTOR
Samuel H. Cochran
By George O. G. Coale
his Attorney

UNITED STATES PATENT OFFICE.

SAMUEL H. COCHRAN, OF EVERETT, MASSACHUSETTS.

ART OF MAKING ARTIFICIAL BUTTER.

SPECIFICATION forming part of Letters Patent No. 285,878, dated October 2, 1883.

Application filed June 15, 1883. (No model.)

*To all whom it may concern:*

Be it known that I, SAMUEL H. COCHRAN, of Everett, in the county of Middlesex and State of Massachusetts, a citizen of the United States, have invented a new and useful Improvement in the Art of Making Artificial Butter, of which the following is a specification.

Various processes have been adopted for the utilization of animal fats and oils in the manufacture of artificial butter, and various elements have entered into the composition of such butter.

My invention relates to the manipulation of any compound containing as a basis animal fats or oils and sweet milk or cream, or both; and it consists, primarily, in the application of heat and cold to the mixture while it is being agitated for the purpose of causing the same to become thoroughly impregnated with the acids which will be formed from the milk or cream, and which gives butter its characteristic flavor. The mass having been so treated, as more fully described below, is in condition to be churned, worked, and packed for market like dairy butter.

My invention also consists in certain processes of churning and otherwise manipulating materials for making artificial butter, whereby an article is produced superior to any now known.

Experience has shown that the consistency of artificial butter depends largely upon the materials used in making it. So, in the butter made by my process below described, various proportions of animal fats and oils may be used with sweet milk or cream, or both, either alone or mixed together, or mixed with refined vegetable oils. The resultant will in any case be artificial butter; but the grade and consistency of the finished butter will depend upon the kinds and proportions of fats and oils used. Under ordinary circumstances suet-oil requires a union with, say, thirty-three per cent., by weight, of refined vegetable oil, either alone or with a little lard. Lard, on the other hand, usually requires thickening, and therefore is best used with a proportion of suet-oil, dairy or creamery butter—say, thirty-three to sixty-six per cent. Whatever fatty matter is used, my process is the same, and is as below described.

The machinery best adapted for the purpose is shown in full in Figure 1 of the drawings, Fig. 2 being a detail or diagram referred to below.

The different portions of the machinery are fully described in the description of the process below given, and so, for brevity, are not referred to further in this part of my specification, except to say that certain portions are of my own invention and form the subject-matter of other applications for Letters Patent.

The proportion of animal fats or animal and vegetable oils being determined, these oils are placed in the mixing-tank A, into which is also put from twenty to forty per cent. (by weight) of sweet milk and cream, or either, according to the quality of the butter desired. The mixing-tank should be provided with suitable means for heating and cooling and also for stirring the mixture—such, for example, as are shown in the drawings. The tank there shown is provided with a jacket, A', and the chamber between the jacket and tank is adapted to be filled with water or steam from the pipes $a$ and $a'$, for the purpose of heating and cooling the mixture. This tank A should be in a room the temperature of which ranges from about 90° to 100° Fahrenheit. The oils and milk should be thoroughly mixed in this tank, the mixture being slowly heated to from 120° to 140° Fahrenheit, this process generally taking from one to two hours. The supply of steam or hot water from pipe $a$ should then be shut off, and the chamber or space around the tank should be filled with cold water from pipe $a'$ and the mixture cooled until it becomes of about the consistency of cream. The stop-cock in pipe $a'$ should then be closed and the stop-cock in pipe $a^2$ opened, so as to empty the chamber around the tank A. The compound should be allowed to stand for some twelve hours, and is then ready for churning and finishing in any one of the ways known to those skilled in the art of making butter. This process of heating slowly the mixture composed of animal fats or animal and vegetable oils and sweet milk or cream, or both, in substantially the proportions named, to the temperature stated, and then cooling it to produce a compound capable of being churned into butter, is the first portion of my invention. I prefer to manipulate the compound for the production of what may be called "crude butter"— that is, butter which has not been worked and finished for the market—as follows: I draw off from the tank A, by means of a suitable pipe leading to the churn B, the desired quantity of the compound, the compound being warmed, if necessary, to enable it to flow freely. This churn B is also jacketed like the tank A, or provided with some suitable means for controlling the temperature of its contents. As shown in the drawings, it has a hot-water-pipe, $b$, a cold-water pipe, $b'$, and an emptying-pipe, $b^2$, each provided with a suitable stop-cock, and adapted for the same purposes with regard to the churn B as the pipes $a$ $a'$ and $a^2$ are with regard to the tank A. It is also preferably provided with a double set of floats, adapted to rotate in opposite directions. These floats being set in motion, and the compound being warmed to a temperature of 100° to 110° Fahrenheit, I now add the coloring-matter, such as is generally used, and about one and one-half per cent., by weight, of salt, to retain the butter-flavor. As soon as the mixture becomes a perfect emulsion I close the steam-valve and open the cold-water valve, so as to cool the mixture to a temperature of about 80° to 90° Fahrenheit, the mixture being constantly agitated during both the heating and cooling. The cold-water valve is then closed and the water drawn off by the valve in the pipe $b^2$. The compound is then drawn off, hardened, and worked in some suitable way. This second portion of my invention consists in the application of heat and cold, in substantially the degrees specified, during the process of churning a material capable of producing butter to be hardened, worked, and finished for the market.

It has been the practice for many years to harden the product of the churn by either drawing it into cold water or onto cracked ice and letting it stand for several hours. Both of these methods I have found objectionable, for the reason that during this process the butter loses much of its flavor and also of its color in consequence of remaining in contact with the ice or water the length of time necessary.

To obtain the best results, I prefer to make use of the churn C and the other apparatus below described in still further finishing the crude butter for the market. This churn is provided with two sets of floats adapted to rotate in opposite directions, and it is preferably pivoted at each end, so that, if desired, it may be turned on its axis and its contents either examined or emptied. When this churn is very large, a crank and suitable gearing should be provided for the purpose of throwing it over. It should also be provided with a suitable lock to prevent it from accidentally upsetting. D is an ice-box, suitably drained and so arranged as to easily supply cracked ice to the churn C without allowing any water to flow into it. As shown in the drawings, the front of the ice-box is adapted to let down and strike the top of the churn, forming a chute for the ice. (See Fig. 2.) The floats in the churn C are set in motion. Then the crude butter is drawn off from churn B into the churn C, and into this is then allowed to slide a quantity of cracked ice from the ice-box D, about equal in weight to the weight of the crude butter. The mass is thoroughly beaten up, so that the ice will come in contact with a greater part of the butter. This process usually takes about five minutes. The churn is then turned over, and its contents fall upon a coarse grating, E. The butter will pass through the meshes of the grating upon the table F, the ice sliding off the grating E (which is inclined for the purpose) into the box G. The butter is now ready to be worked, packed, and handled like dairy butter.

If it is desired to make a high grade of butter, dairy or creamery butter in its normal marketable condition may be thrown into churn C and united with the crude butter and ice. The dairy or creamery butter becoming thoroughly mixed with the artificial butter improves its consistency and its flavor. In this case the dairy or creamery butter should be put into the churn first and beaten up for a few minutes, so as to soften it; then the crude butter from churn B. Afterward the ice should be put in. In the same way dairy or creamery butter may added to any suitable fatty substance in order to make a compound adapted for cooking or other purposes.

Melted butter has heretofore been mixed with compounds for the purpose of giving them a butter-flavor; but, in melting, butter loses much of its natural flavor and acquires instead an oily taste, which does not materially improve the quality of the artificial butter with which it is mixed.

What I claim as my invention is—

1. The process above described of preparing fats or oils and sweet milk or cream for churning, which consists in mixing them together under the influence first of heat and then of cold, as set forth.

2. The process of churning above described, which consists in the application first of heat and then of cold to the substance being churned, in substantially the degrees named, during the action of the churn and while the butter is being produced, all substantially as described.

3. The process above described of hardening newly-churned or crude butter, which consists in churning or mixing it thoroughly with cracked ice for a short time, and then completely separating the ice from the butter before the butter has become hard, and allowing it to finish hardening while separated from the ice, all as set forth.

4. The process above described of making artificial butter from fats or oils and sweet milk or cream, which consists, first, in mixing the fats or oils and milk or cream together under the influence of heat and cold; second, in churning the compound so produced and working and hardening it, all substantially in the manner set forth.

5. The process of making butter above described, which consists in churning the butter-making liquid while under the influence first of heat and then of cold, in substantially the degrees above specified, drawing off the crude butter so formed, and hardening and working it, all substantially as set forth.

6. The process above described of making butter from fats or oils and sweet milk or cream, which consists, first, in mixing the ingredients together under the influence of heat and cold; second, in churning the ingredients under the influence of heat and cold; third, in hardening the crude butter so formed and working it, all as in the manner set forth.

7. The process above described of making butter from fats or oils and sweet milk or cream, which consists, first, in mixing the ingredients under the influence of heat and cold; second, of churning the ingredients under the influence of heat and cold; third, in hardening the crude butter by the short application of ice and working it, all substantially in the manner specified.

8. The mode above described of hardening artificial butter without causing it to lose its flavor, which consists in the quick application thereto of cracked ice, substantially as set forth.

9. The mode above described of giving a butter flavor to animal fats or oils, which consists in mixing therewith in the manner above described a quantity of dairy or creamery butter in its normal or hard condition, substantially as set forth.

In testimony whereof I have hereunto subscribed my name.

SAMUEL H. COCHRAN.

Witnesses:
J. F. BLIGH,
GEORGE O. G. COALE.